Figure 1:
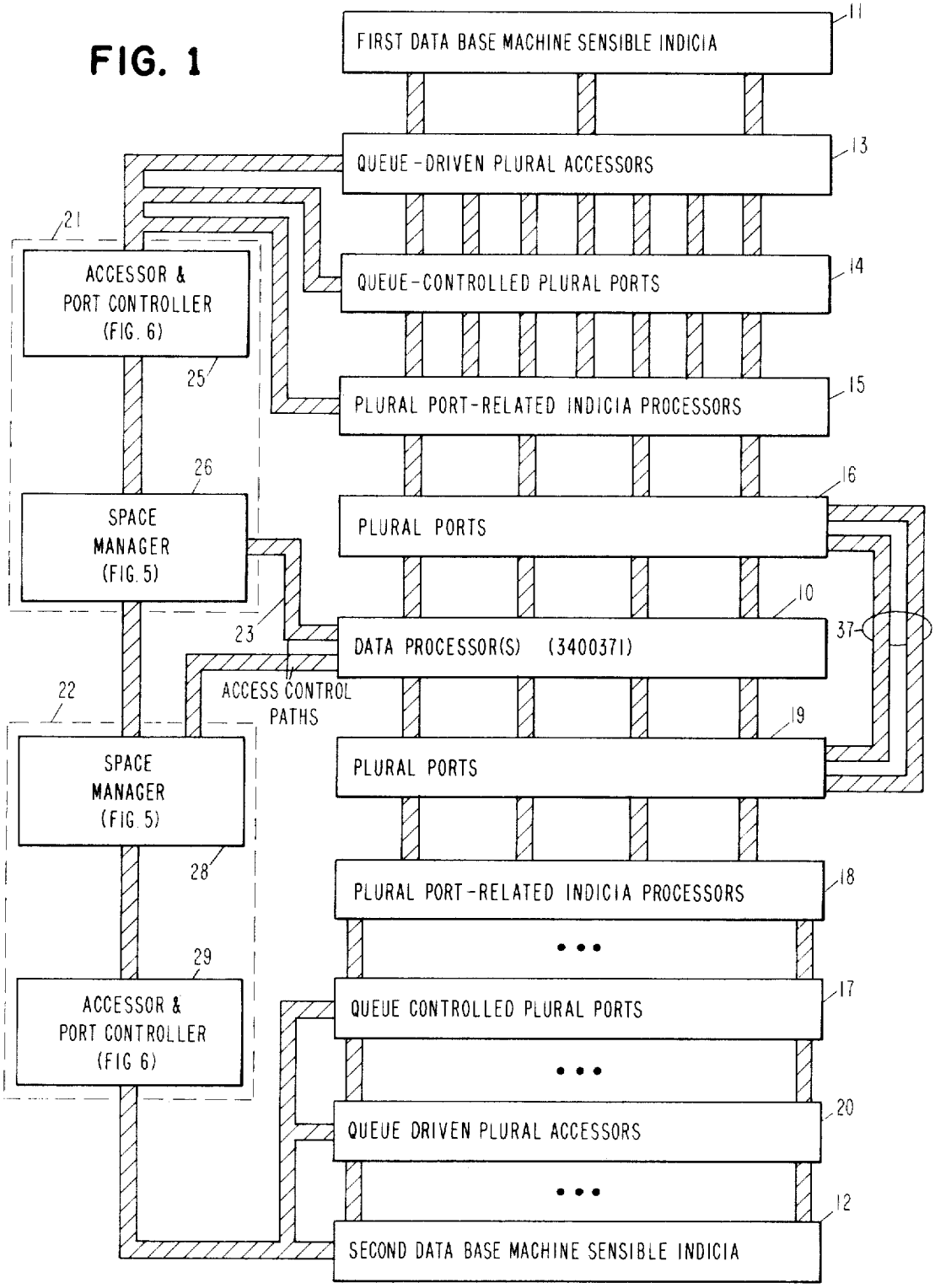
Figure 2:
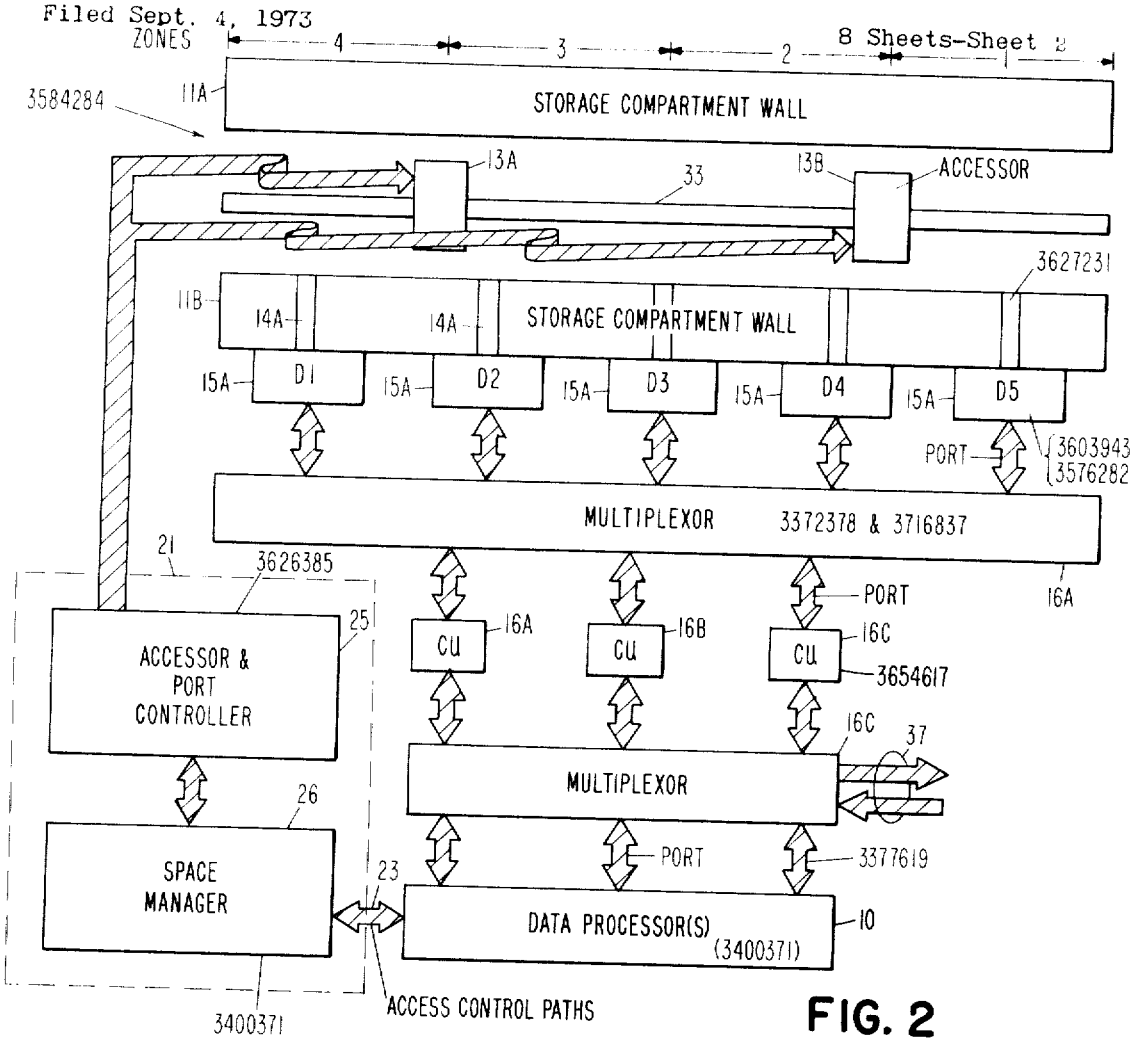
Figure 2A:
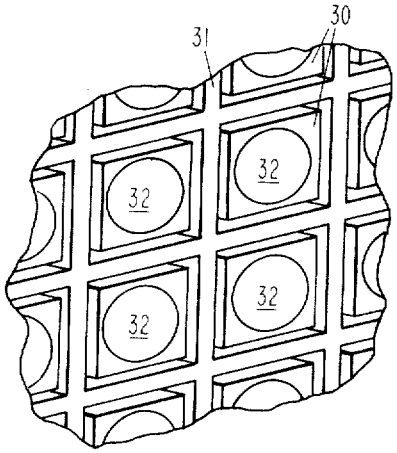
Figure 3:
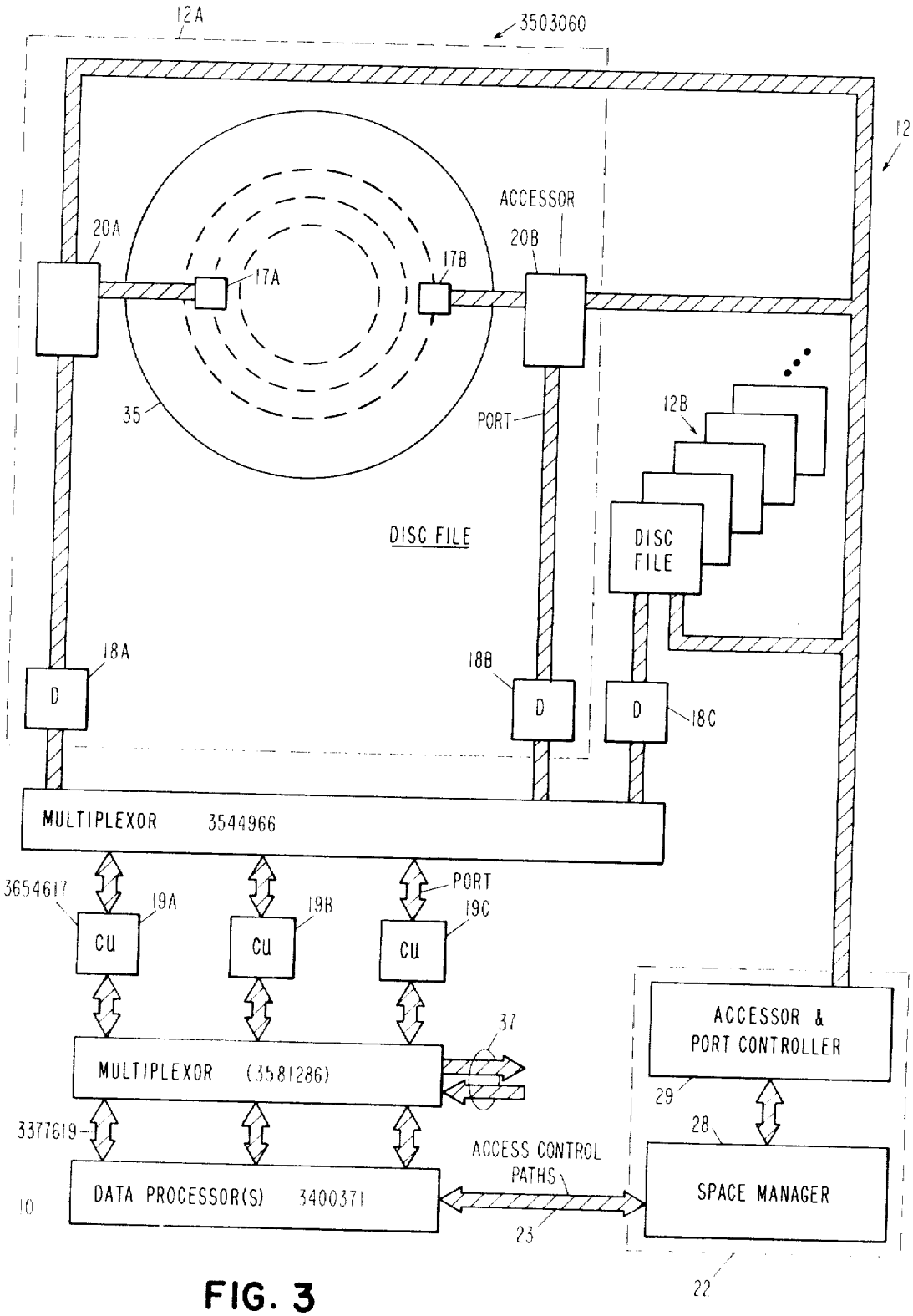
Figure 4:
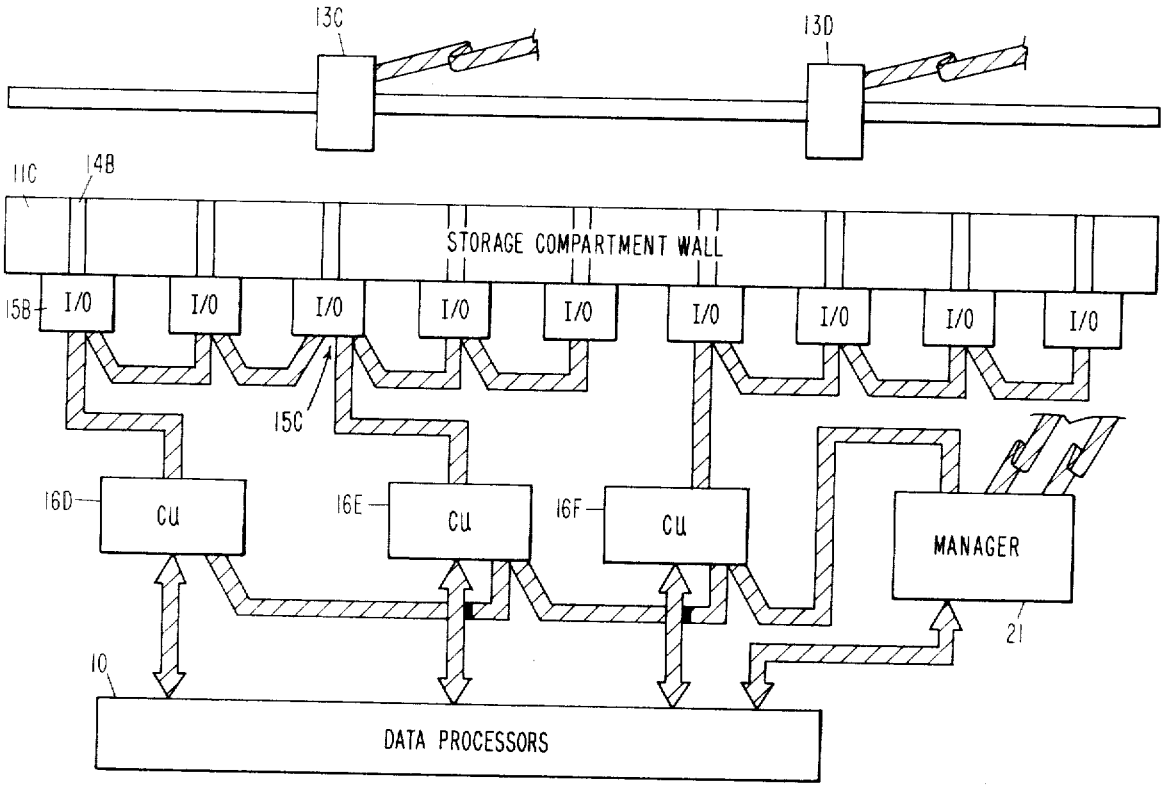
Figure 5:
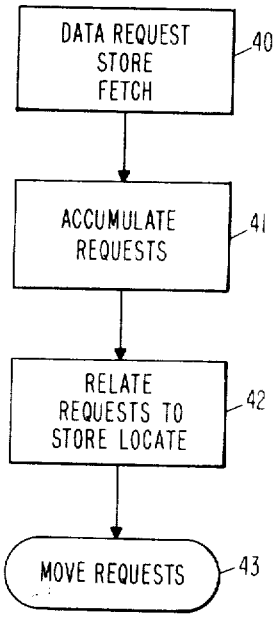
Figure 6:
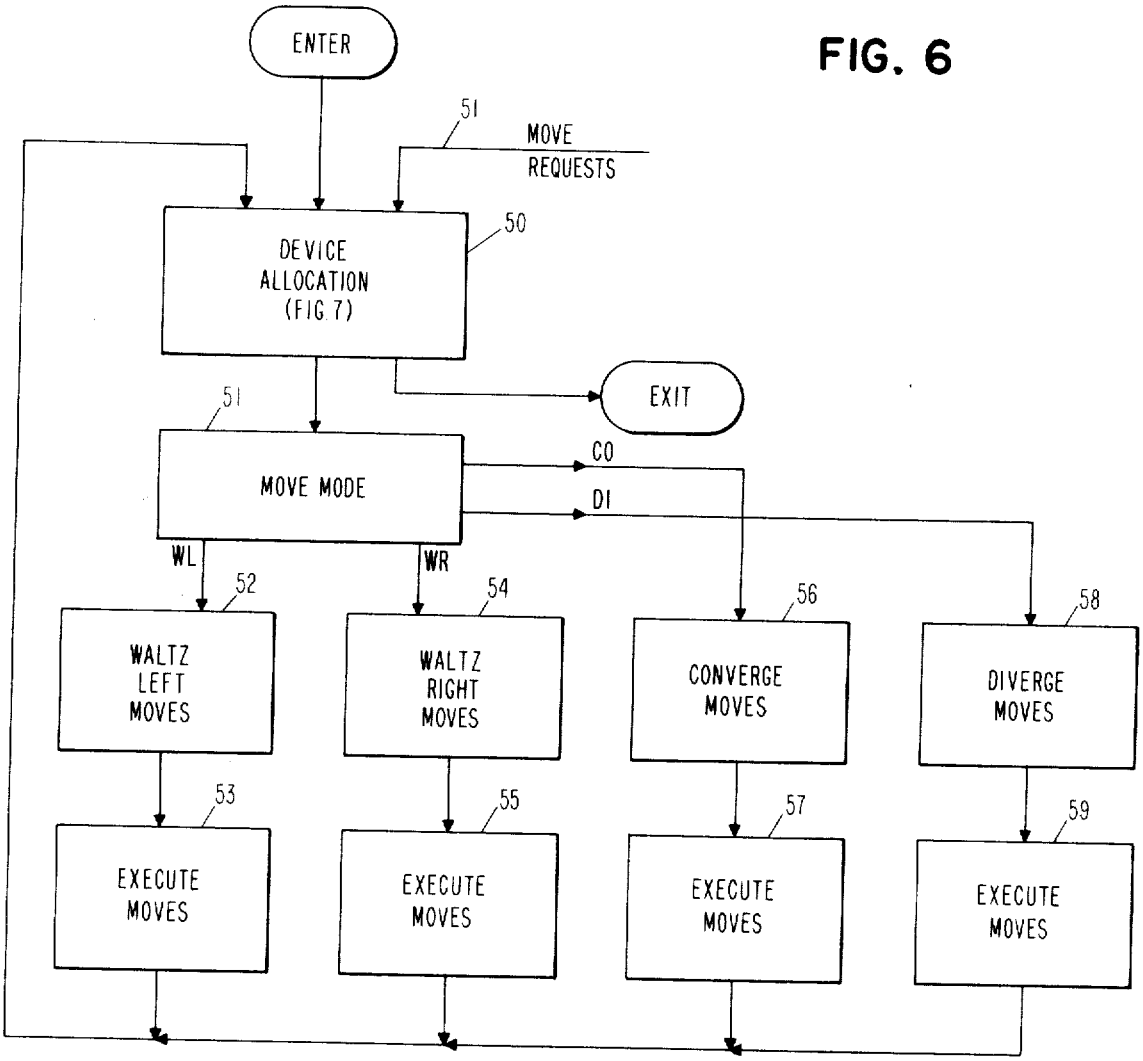
Figure 7:
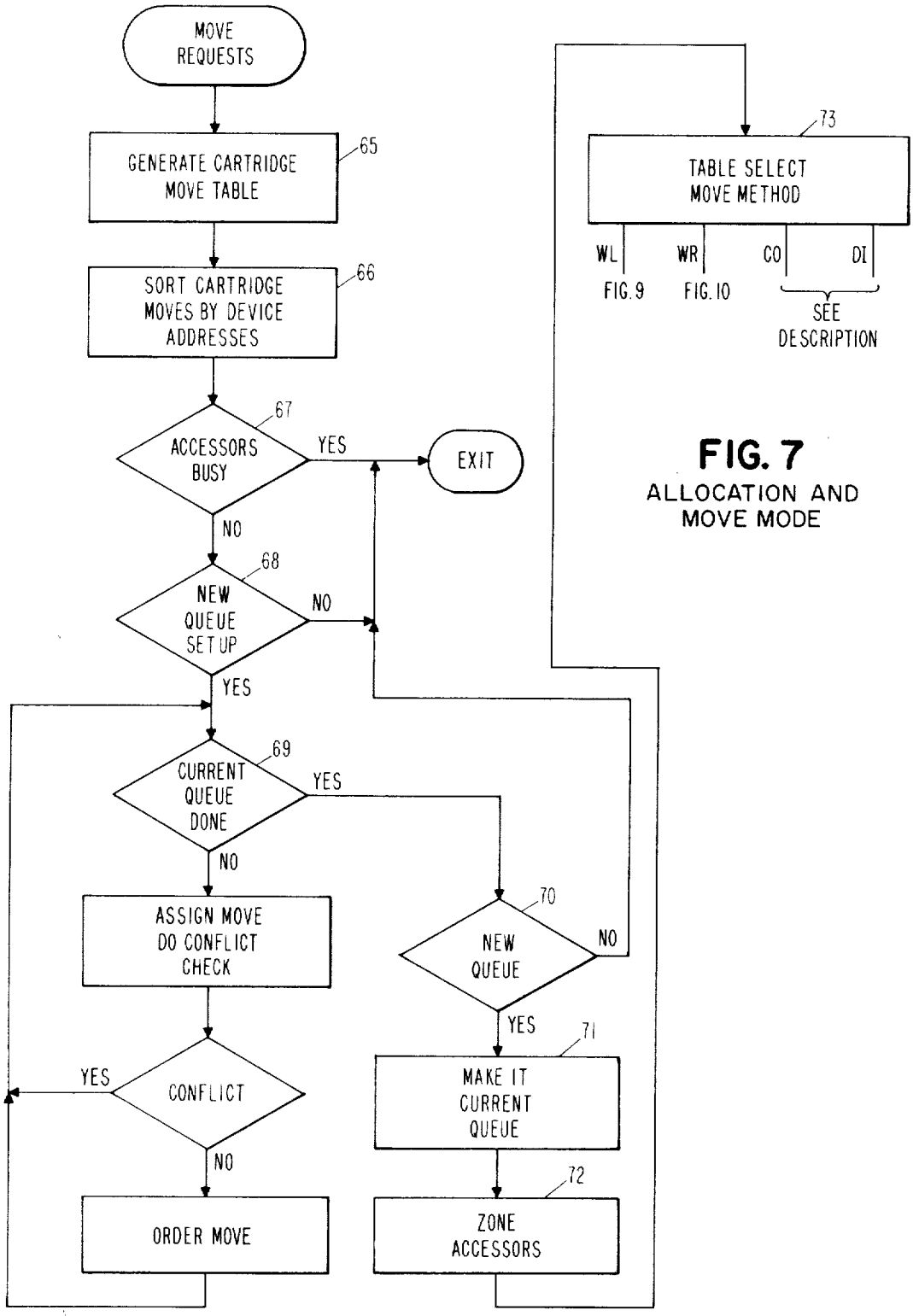
Figure 8:
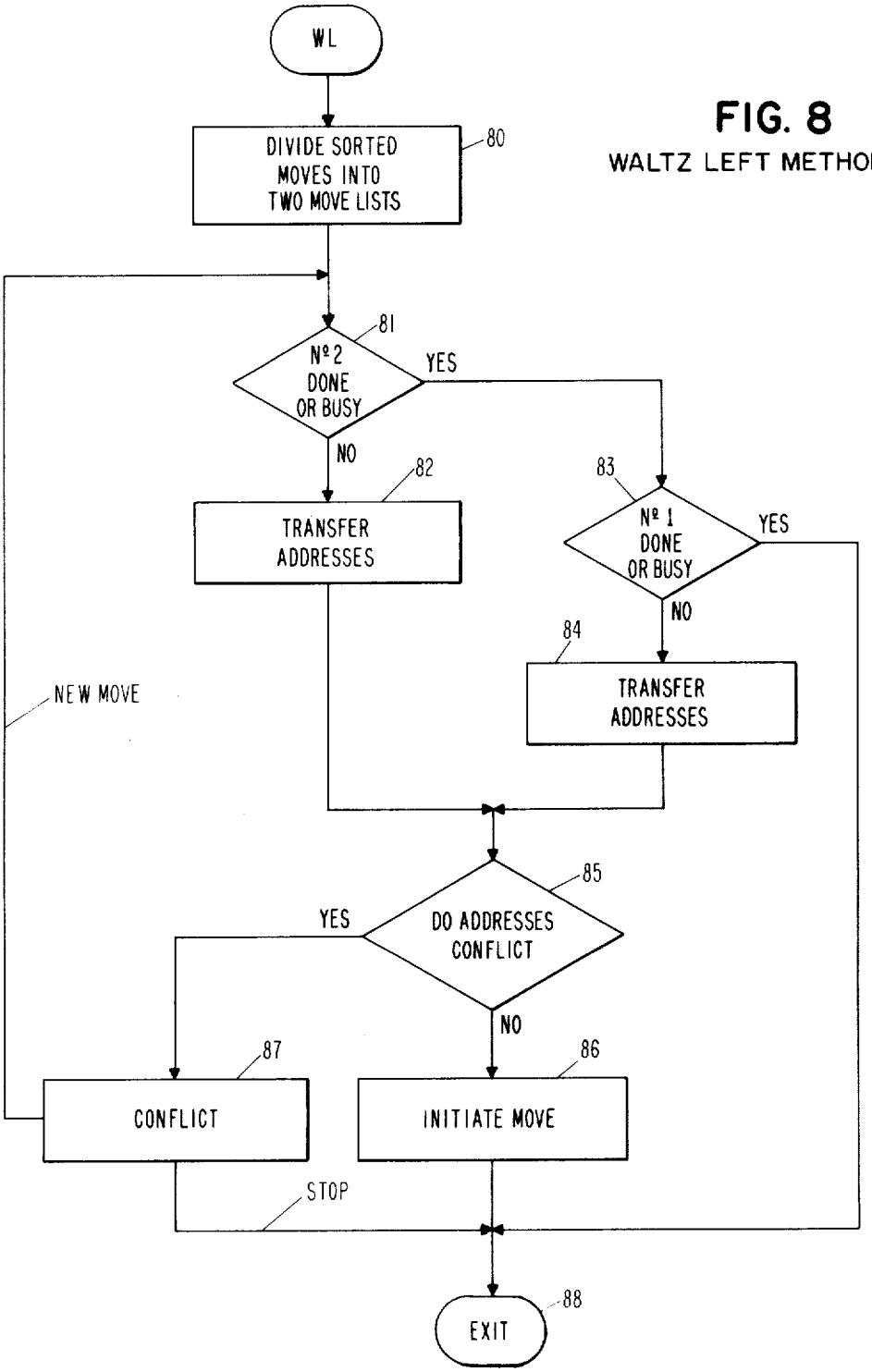
Figure 9:
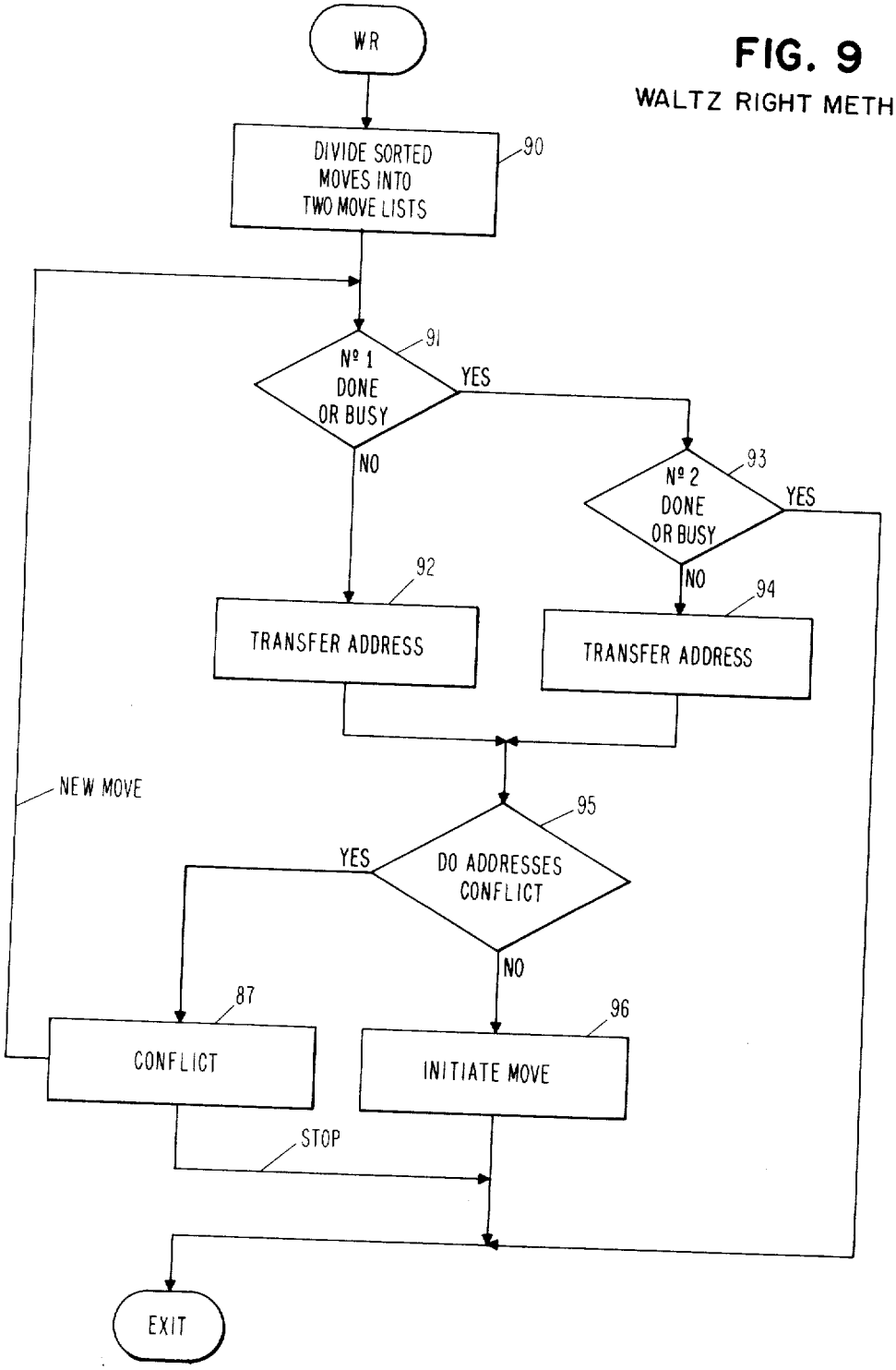

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 869

T921,023

INFORMATION AND STORAGE RETRIEVAL SYSTEMS

William L. Carter, Longmont, and John J. Rhinehart and Henry J. Zentgraf, Boulder County, Colo., assignors to International Business Machines Corporation, Armonk, N.Y.

Filed Sept. 4, 1973, Ser. No. 394,371
Int. Cl. G06f *15/40, 13/00, 7/22*
U.S. Cl. 340—172.5
8 Sheets Drawing. 102 Pages Specification

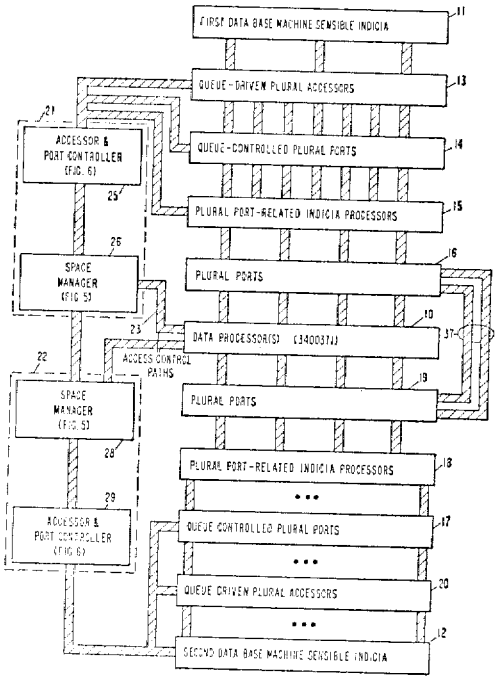

In an information storage and retrieval system, a data base in machine-sensible indicia (tape cartridges at 11, disks at 12) is accessed by queue-driven plural accessors (cartridge transport or disk arms) which, in turn, communicate with queue-controlled plural ports (tape transport or disk file recording circuits). A plurality of intervening control units and ports selectively transfers information-bearing signals between a data processor and the data base. In a preferred form, there are two data bases—a first, or larger, data base stored on magnetic tape within movable cartridges, and a second data base having a shorter access time and preferably on a plurality of disk files each preferably having queue-driven plural accessors. Data can be transferred from either data base to the data processor or between the data bases. Accessor control using queuing techniques maximizes cartridge throughput for enhancing information storage and retrieval operations by minimizing accessor motions in a critical manner.

INFORMATION AND STORAGE RETRIEVAL SYSTEMS

Filed Sept. 4, 1973 8 Sheets-Sheet 1

INFORMATION AND STORAGE RETRIEVAL SYSTEMS

Filed Sept. 4, 1973 8 Sheets-Sheet 2

INFORMATION AND STORAGE RETRIEVAL SYSTEMS

Filed Sept. 4, 1973 8 Sheets-Sheet 3

ALLOCATION AND MOVE MODE

WALTZ LEFT METHOD - 52

WALTZ RIGHT METHOD - 54